United States Patent [19]

Logothetis et al.

[11] Patent Number: 5,051,479

[45] Date of Patent: Sep. 24, 1991

[54] MELT PROCESSABLE TFE COPOLYMERS WITH IMPROVED PROCESSABILITY

[75] Inventors: Anestis L. Logothetis, Wilmington; Charles W. Stewart, Newark, both of Del.

[73] Assignee: E. I. Du Pont de Nemours and Company, Wilmington, Del.

[21] Appl. No.: 332,030

[22] Filed: Apr. 3, 1989

[51] Int. Cl.$^5$ .............................................. C08L 27/18
[52] U.S. Cl. .................................. 525/197; 525/199; 525/200
[58] Field of Search ..................... 525/199, 200, 197

[56] References Cited

U.S. PATENT DOCUMENTS

| | | | |
|---|---|---|---|
| 2,946,763 | 7/1960 | Bro et al. | 525/199 |
| 3,467,638 | 9/1969 | Pattison | 525/376 |
| 3,484,503 | 12/1969 | Magner et al. | 525/200 |
| 3,528,954 | 9/1970 | Carlson | 526/247 |
| 4,035,565 | 7/1977 | Apoteker et al. | 526/249 |
| 4,281,092 | 7/1981 | Breazeale | 525/331 |
| 4,529,784 | 7/1984 | Finlay | 526/247 |
| 4,555,543 | 11/1985 | Effenberger et al. | 525/200 |
| 4,617,351 | 10/1986 | Heckel et al. | 525/200 |
| 4,713,418 | 12/1987 | Logothetis et al. | 525/200 |

FOREIGN PATENT DOCUMENTS

| | | | |
|---|---|---|---|
| 52-86442 | 7/1977 | Japan . | |
| 58-021440 | 2/1983 | Japan . | |
| 038740 | 3/1983 | Japan | 525/200 |
| 069241 | 4/1983 | Japan | 525/200 |
| 122735 | 5/1988 | Japan | 525/200 |

Primary Examiner—John C. Bleutge
Assistant Examiner—David Buttner

[57] ABSTRACT

A melt-processable thermoplastic composition consisting essentially of a blend of a melt processable thermoplastic fluorocarbon polymer and about 0.05 to about 0.5 percent by weight of an elastomeric copolymer of tetrafluoroethylene and a perfluoro(alkyl vinyl ether) exhibits improved processing properties.

13 Claims, No Drawings

MELT PROCESSABLE TFE COPOLYMERS WITH IMPROVED PROCESSABILITY

BACKGROUND OF THE INVENTION

This invention relates to thermoplastic copolymers of tetrafluoroethylene (TFE) with improved processibility, and in particular, increased rates of extrusion prior to the onset of melt fracture.

The practical extrusion rate of melt processible or thermoplastic fluoropolymer resins is limited by melt fracture of the polymer. Melt fracture causes roughness and flaws on the surface of the extrudate. It is desirable to increase the useful extrusion rate to increase the output and lower the cost of manufacturing of such resins. One can generally increase the rate at which copolymers of TFE can be extruded, prior to the onset of melt fracture, by decreasing the molecular weight of the copolymer. However, this usually leads to problems with thermal stress cracking in the resulting polymer. Alternatively one can increase the level of comonomer to improve the stress cracking resistance; however, this approach leads to a deterioration in certain electrical properties, such as the dielectric constant and dissipation factor. Fluoroelastomers, such as copolymers of vinylidene fluoride and hexafluoropropylene, can be added to low molecular weight thermoplastic TFE copolymers to improve the thermal stress cracking resistance; however, this also causes a deterioration in certain electrical properties.

Japanese Patent application 52/86442 discloses blends of a TFE/hexafluoropropylene copolymer with fluorine-containing elastomers for improved thermal stress-cracking resistance. The fluorine-containing elastomer is used at a level of from 0.05 to 10 % by weight. Suitable elastomers include HFP/vinylidene fluoride copolymers, TFE/vinylidene fluoride/HFP ternary polymers, TFE/propylene copolymers, TFE/chlorovinyl ether copolymers, TFE/ethylene/propylene ternary copolymers, ethylene/HFP copolymers, TFE/ethylene/HFP ternary copolymers, TFE/ethylene/hexafluoroacetone ternary copolymers, and TFE/hexafluoroacetone copolymers. All other fluorine resins, such as polyvinylidene fluoride, polytetrafluoroethylene, polytetrafluoroethylene wax, and tetrafluoroethylene/fluorovinyl ether, are said to have no effect.

U.S. Pat. No. 4,617,351, Heckel et al., discloses enhancement of the extrusion rate of melt extrudable thermoplastic perfluorocarbon polymers by the addition of up to 1% of a hydrocarbon polymer.

U.S. Pat. No. 4,713,418, Logothetis et al., discloses a blend of 100 parts of a cured fluoroelastomer and 2 to 50 parts of a thermoplastic perfluorocarbon copolymer containing TFE monomer, which is present as generally spherical particles having a particle size of less than 10 microns. The blend has improved tensile strength and tear strength.

U.S. Pat. No. 3,484,503, Magner et al., discloses blends of a copolymer of TFE and perfluoro(methyl vinyl ether) with TFE homopolymer or TFE/hexafluoropropylene copolymer. The TFE/perfluoro(methyl vinyl ether) is the major component of the blend. The blends are characterized by being relatively easy to fabricate and extrude, but also by being resistant to flow at higher temperatures.

U.S. Pat. No. 4,555,543, Effenberger et al., discloses fluoropolymer coating compositions of a fluoroplastic resin dispersion modified by blending with at least 5% of a fluoroelastomer composition, preferably a latex, and films formed therefrom. The fluoroplastic may be polytetrafluoroethylene or fluorinated ethylene propylene copolymer, and the fluoroelastomer may be a copolymer of tetrafluoroethylene with perfluoro(alkyl vinyl ether). Such compositions are useful for manufacture of crack-free coatings.

SUMMARY OF THE INVENTION

It has now been found that addition of a very small amount of a particular fluorinated elastomer to certain TFE copolymers provides a composition with significantly improved melt processibility without the disadvantages found in prior art compositions.

Thus the present invention provides a melt processable thermoplastic composition consisting essentially of a blend of a melt processable thermoplastic fluorocarbon polymer and about 0.05 to about 0.5 percent by weight of an elastomeric copolymer of tetrafluoroethylene and a perfluoro(alkyl vinyl ether) wherein the alkyl group contains 1 to 5 carbon atoms.

The present invention further provides a process for extruding a melt processable thermoplastic fluorocarbon polymer, comprising the steps of selecting an elastomeric copolymer of tetrafluoroethylene and a perfluoro(alkyl vinyl ether) wherein the alkyl group contains 1 to 5 carbon atoms; uniformly admixing about 0.05 to about 0.5 weight percent of said elastomeric copolymer with the fluorocarbon polymer; heating the mixture of fluorocarbon polymer and elastomeric copolymer to a temperature sufficient to melt the mixture; and extruding the resulting mixture.

DETAILED DESCRIPTION OF THE INVENTION

The first component of the composition of the present invention is a thermoplastic fluoropolymer resin. This resin comprises the predominant portion of the composition, normally comprising about 99.5 to 99.95 percent by weight, exclusive of fillers or traditional additives, which may be present in customary amounts. Alternatively, this first component may itself be a blend of thermoplastic fluoropolymer resins. In this case the overall thermoplastic fluoropolymer component will normally comprise about 99.5 to 99.95% of the composition.

The particular thermoplastic fluoropolymer resins useful in the practice of the subject invention are copolymers of tetrafluoroethylene (TFE) with enough of one or more ethylenically unsaturated comonomers to make the polymer melt extrudable. Suitable comonomers include ethylene, (perfluorobutyl)ethylene, hexafluoropropylene (HFP), and perfluoro(alkyl vinyl ethers) in which the perfluoroalkyl group contains 1 to 5 carbon atoms. Generally the comonomers will comprise about 1 to about 20 mole percent of the copolymer and the TFE will comprise the remainder. A particularly preferred thermoplastic fluoropolymer is the copolymer of TFE with about 9 to about 14 percent by weight HFP. Suitable thermoplastic copolymers will generally have specific melt viscosities of about $1 \times 10^3$ to about $1 \times 10^6$ Pa.s, (as measured by ASTM D-1238-52T, modified by (1) using a cylinder, orifice, and piston tip made of a corrosionresistant alloy, Haynes Stellite 19, (2) charging a 5.0 g sample to the 9.53 mm inside diameter cylinder which is maintained at $372 \pm 1°$ C., (3) extruding the sample 5 minutes after charging through a 2.10 mm diameter, 8.9 mm long square-edged orifice under a load of 5000 g. The melt viscosity in poise is calculated as 53,150 divided by the observed extrusion rate in g/min.) The polymers are thus melt processable. That is, they can be extruded or formed into articles by melting and shaping.

Such thermoplastic fluoropolymers are well known and commercially available, and may be prepared by aqueous or non-aqueous free-radical polymerization, as taught in U.S. Pat. Nos. 3,528,954 and 2,946,763.

The second component of the compositions of the present invention is at least on fluoroelastomer. This component is present in a small and carefully defined amount. It will normally comprise about 0.05 to about 0.5 weight percent of the composition, based on the total of the polymeric components (exclusive of fillers and traditional additives). Preferably it will comprise about 0.08 to about 0.2 weight percent of the composition. When less than about 0.05% of the fluoroelastomer is added, the advantages of the present invention are not fully realized. At the other extreme, addition of fluoroelastomer much in excess of about 0.5% to 1% results in surface roughness, since the fluoroelastomer is not sufficiently compatible with the thermoplastic resin. It is within this functionally defined region that the present invention lies.

The fluoroelastomer is, with the exception of a minor amount of an optional third comonomer, a perfluoroelastomer. Specifically, the fluoroelastomer is a copolymer of TFE with a sufficient amount of a perfluoro(alkyl vinyl ether) to provide elastomeric properties. The alkyl group of the perfluoro(alkyl vinyl ether) preferably contains 1 to 5 carbon atoms, and most preferably this comonomer is perfluoro(methyl vinyl ether). The amounts of the monomers generally used to prepare such perfluoroelastomers include about 25 to about 40 mol % perfluoro(alkyl vinyl ether) and about 57 to about 75 mol % TFE. When less than about 25% of the perfluoroalkyl vinyl ether is added, the copolymer does not exhibit sufficient elastomeric properties; addition of more than about 40% of perfluoroalkyl vinyl ether is practically difficult.

The molecular weight of the fluoroelastomer should normally be sufficiently high that it can be mixed into the molten thermoplastic resin. If the molecular weight is too low, improvement in processing is not observed. In most cases the inherent viscosity of such polymers is greater than 0.05 dL/g, as measured at a 0.1% by weight concentration in a solvent of 60/40/3 volume ratio of heptafluoro-2,3,3-trichlorobutane, perfluoro(butyltetrafluorohydrofuran) and ethylene glycol dimethyl ether at 30° C.

Optionally up to about 3 mol % of a third comonomer may be included in the fluoroelastomer. Such comonomers may be selected from the group consisting of vinylidene fluoride; vinyl fluoride; trifluoroethylene; (perfluoroalkyl)ethylene wherein the perfluoroalkyl group contains 1 to 5 carbon atoms; fluoroolefins of 2 to 5 carbon atoms optionally substituted with chlorine, bromine, or iodine, for example 4-bromo-3,3,4,4-tetrafluorobutene, bromotrifluoroethylene, 4-iodo-3,3,4,4-tetrafluorobutene, or iodotrifluoroethylene; perfluorophenoxy perfluoroalkylenevinyl ethers wherein the perfluoroalkylene group contains 1 to 5 carbon atoms, for example perfluoro-2-phenoxypropyl ether; and nitrilesubstituted perfluorvinyl ethers of the formula $CF_2=CF(O-R_f)_nCN$ wherein $R_f$ is a perfluoroalkylene group of 2 or 3 carbon atoms and n is 1 to 4. Other comonomers may be present which do not interfere with the functioning and properties of the fluoroelastomer. In particular, the fluoroelastomer should be sufficiently thermally stable to survive processing above the melt temperature of the thermoplastic TFE copolymer, as described below.

Such fluoroelastomers are well known and commercially available and may be prepared by an emulsion process. These fluoroelastomers and the method of their preparation are described in more detail in U.S. Pat. Nos. 3,467,638, 4,035,565, 4,281,092, and 4,529,784.

The composition of the present invention is preferably prepared by blending the fluoroelastomer into the thermoplastic TFE polymer at a temperature which is sufficiently high to melt the TFE polymer, usually above 300° C. The addition can be accomplished by any of the means for incorporating additives into fluoroplastics, such as through the use of a compounding mill, a Banbury mixer, or a mixing extruder. It is also possible to blend the two polymers in the solid state, and thereafter to cause uniform distribution of the fluoroelastomer by passing the blend through a melt extruder, as would normally be done during fabrication of a shaped article.

The composition of the present invention retains the physical properties of the thermoplastic TFE polymer, but exhibits improved processability. In particular, the melt fracture of the polymer is reduced. Melt fracture causes roughness and flaws on the surface of an extrudate, and is particularly objectionable for, e.g., wire coating, for which uniformity is important. The composition of the present invention is thus particularly useful for preparing films or wire coatings of improved uniformity. It is also useful for preparing tubing and films.

EXAMPLE 1

Telephone primary wire constructions were made by extruding a fluoropolymer sample, 0.127 mm thick, onto a 0.511 mm copper wire substrate. The extrusion was done on a 50.8 mm Davis-Standard extruder fitted with a wire coating crosshead. The extrusion temperature profile was as follows: rear barrel 382° C., center barrel 393° C., front barrel 399° C., clamp 418° C., adapter 416° C., crosshead 418° C., and die 418° C. Crosshead tooling was selected to give a draw down ratio of 120:1 with a wall thickness of 0.127 mm. Die diameter was 8.1 mm and guide tip diameter was 5.1 mm. Wire preheat was 235° C. Electrical flaws in the insulation along the wire were measured during the extrusion using a high-frequency sine wave spark tester operating at 5 kv, through which the insulated wire passed. A flaw in the insulation allowed a spark to jump to the wire conductor. The arc was sensed and counted by a mechanical spark counting device. A flaw rate of greater than one flaw per 300 m of coated wire was considered to be unacceptable. Wire coating line speed was gradually increased until electrical flaws were observed at a rate greater than one flaw per 300 m.

CONTROL SAMPLE 1

A control sample of TFE/HFP copolymer having no additive was extruded onto the wire. The temperature of the resin melt was 412° C. The resin ran at a maximum line speed of 3.3 m/s before electrical flaws exceeded one per 300 m.

SAMPLE 1A

A blend was prepared by extrusion compounding at 350° C., on a 30 mm twin screw extruder, a thermoplastic copolymer of TFE and hexafluoropropylene ("HFP"), having a weight ratio of comonomers TFE/HFP of 87.7/12.3, a melt viscosity of $8.18 \times 10^3$ Pa.s, melt flow number of 7 (ASTM-D2116), together with 0.1 wt. % of a perfluoroelastomer copolymer of TFE, perfluoro(methylvinyl ether) ("PMVE") and perfluoro-2-phenoxypropylvinyl ether (P2PPVE) having a weight ratio of comonomers TFE/PMVE/P2PPVE of 55/43.2/1.8 and an inherent viscosity of 0.7 dL/g (measured as described above).

This blend was extruded onto the copper wire at 414° C. This blend ran at a maximum line speed of 6.1 m/s before electrical flaws exceeded one per 300 m. In addition, it was observed that the variation in thickness of the insulation was less than that for the control and the surface of the finished wire was significantly smoother than that of the control. Dielectric strength, dielectric constant, and dissipation factor were practically unchanged from the control. No discoloration could be observed.

COMPARATIVE SAMPLE 1B

A blend was prepared by extrusion compounding as above the same TFE/HFP copolymer with 0.1 wt. % of a fluoroelastomer copolymer of vinylidene fluoride ("VF$_2$") and HFP having a weight ratio of comonomers VF$_2$/HFP=60/40 and a Mooney Viscosity of 40 ML-10 (100° C.) (ASTM D-1646).

This blend was extruded onto the copper wire at 412° C. The resin blend ran at a maximum line speed of 3.8 m/s before electrical flaws exceeded one per 300 m.

COMPARATIVE SAMPLE 1C

A blend was prepared by extrusion compounding as above the same TFE/HFP copolymer with 0.1 wt. % of a perfluoroelastomer of poly(hexafluoropropylene oxide) having an inherent viscosity of 0.11 dL/g at 1% by weight at 30° C. in Freon ®E. (Freon ®E is a low molecular weight poly(hexafluoropropylene oxide) fluid from E. I. du Pont de Nemours and Company.)

This blend was extruded onto the copper wire at 411° C. The blend ran at a maximum line speed of 3.8 m/s before electrical flaws exceeded one per 300 m.

These results show that the addition of 0.1 wt. % of a TFE/PMVE/P2PPVE perfluoroelastomer to a melt processable thermoplastic TFE/HFP copolymer significantly increases the rate at which wire can be coated with the resin. The addition of either of the additives of comparative samples has a negligible effect.

Sample 1A, Comparative Sample 1B, Comparative Sample 1C, and the control were further examined using an Instron TM capillary rheometer to measure shear stress as a function of shear rate (ASTM D1703). The capillary diameter was 0.1273 cm, capillary length was 5.08 cm, and the test temperature was 400° C. The results are shown in the Table.

TABLE

| Sample | Shear stress, kPa, at indicated shear rate | | | | |
|--------|---------|----------|----------|----------|----------|
|  | 90 sec$^{-1}$ | 150 sec$^{-1}$ | 225 sec$^{-1}$ | 300 sec$^{-1}$ | 450 sec$^{-1}$ |
| Control | 170 S* | 227 S | 277 S | 328 R | 546 R |
| 1A | 110 S | 200 S | 325 S | 351 S | 370 R |
| 1B | 220 S | 295 S | 365 R | | |
| 1C | 230 S | 260 S | 275 R | | |

*S and R indicate that the extrudate had a smooth or rough surface, respectively. measurement not made.

It is seen from the data in the Table that for the control sample, melt fracture was observed at a shear rate of 300 sec$^{-1}$, whereas for sample 1A of the present invention, melt fracture did not occur until a shear rate of 450 sec$^{-1}$. For Comparative Samples 1B and 1C, containing additives not a part of the present invention, melt fracture occurred at a shear rate of 225 sec$^{-1}$. Thus only the selected additive of the present invention was effective in increasing the shear rate at which melt fracture occurs.

EXAMPLE 2

Telephone primary wire constructions were made as in Example 1, except that the extrusion temperature profile was as follows: rear barrel 294° C., center barrel 310° C., front barrel 310° C., clamp 316° C., adapter 316° C., crosshead 327° C., and die 338° C. Wire preheat was 210° C. Electrical flaws in the insulation along the wire were measured as in Example 1.

CONTROL SAMPLE 2

A control sample of a thermoplastic, melt processable copolymer of TFE, ethylene (E), and (perfluorobutyl)ethylene (PFBE) having weight ratio of comonomers TFE/E/PFBE of 77.6/19/3.4, a melt viscosity of $4 \times 10^3$ Pa.s, and a melt flow number of 8 (ASTM-D3159), having no additive, was extruded onto the wire at a temperature of 316° C. This resin ran at a maximum line speed of 0.51 m/s before electrical flaws exceeded one per 300 m.

SAMPLE 2A

Using the extrusion compounding equipment and conditions of Example 1, a blend was prepared of the TFE/E/PFBE copolymer described in Control Sample 2, with 0.1 wt. % of a perfluoroelastomer copolymer of TFE, PMVE, and perfluoro(8-cyano-5-methyl-3,6-dioxo-1-(octene) (8CNVE) having a weight ratio of comonomers TFE/PMVE/8CNVE of 56/42/2 and an inherent viscosity of 0.7 dL/g at 30° C.

This blend was extruded onto the copper wire at 317° C. this blend ran at a maximum line speed of 1.0 m/s before electrical flaws exceeded one per 300 m. As before, it was observed that the variation in thickness of the insulation was less than that for the control and the surface of the finished wire was significantly smoother than that of the control. Dielectric strength, dielectric constant, and dissipation factor were practically unchanged from the control. No discoloration could be observed. It is observed that the addition of 0.1 wt. % of a TFE/PMVE/8CNVE perfluoroelastomer to a thermoplastic, melt processable TFE/E/PFBE copolymer significantly increases the rate at which wire can be coated with the resin before electrical flaws develop.

We claim:

1. A melt processable thermoplastic composition consisting essentially of a blend of:
    (a) at least one melt processable fluorocarbon polymer; and
    (b) about 0.05 to about 0.5 percent by weight of at least one elastomeric copolymer of about from 57 to 75 mole percent tetrafluoroethylene and about from 25 to 40 mole percent of a perfluoro(alkyl vinyl ether) wherein the alkyl group contains 1 to 5 carbon atoms.

2. The composition of claim 1 wherein the amount of elastomeric copolymer is about 0.08 to about 0.2 percent by weight.

3. The composition of claim 1 wherein the melt processable thermoplastic fluoropolymer is a copolymer of tetrafluoroethylene with an amount of at least one ethylenically unsaturated comonomer sufficient to make the copolymer melt processable.

4. The composition of claim 3 wherein the comonomer is hexafluoropropylene.

5. The composition of claim 4 wherein the amount of hexafluoropropylene comonomer in the copolymer of tetrafluoroethylene is about 9 to about 14 weight percent and the melt viscosity of the copolymer is about $1 \times 10^3$ to about $1 \times 10^6$ Pa.s.

6. The composition of claim 1 wherein the elastomeric copolymer comprises about 57 to about 75 mol percent tetrafluoroethylene and about 25 to about 40 mole percent of the perfluoro(alkyl vinyl ether) and the alkyl group of the perfluoro(alkyl vinyl ether) is perfluoromethyl.

7. The composition of claim 6 wherein the elastomeric copolymer further contains up to about 3 mol percent of a third fluorine-containing comonomer copolymerizable therewith.

8. The compositions of claim 7 wherein the third comonomer is selected from the group consisting of vinylidene fluoride, vinyl fluoride, trifluoroethylene, (perfluoroalkyl)ethylene wherein the perfluoroalkyl group contains 1 to 5 carbon atoms, fluoroolefins of 2 to 5 carbon atoms, fluoroolefins of 2 to 5 carbon atoms substituted with chlorine, bromine, or iodine, perfluorophenoxy perfluoroalkylenevinyl ethers wherein the perfluoroalkylene group contains 1 to 5 carbon atoms, and nitrile-substituted perfluorvinyl ethers of the formula $CF_2=CF(O-R_f)_nCN$ wherein $R_f$ is a perfluoroalkylene group of 2 or 3 carbon atoms and n is 1 to 4.

9. A process for extruding a melt processable thermoplastic fluorocarbon polymer, comprising the steps of
   (a) selecting an elastomeric copolymer of about from 57 to 75 mole percent tetrafluoroethylene and about from 25 to 40 mole percent of a perfluoro(alkyl vinyl ether) wherein the alkyl group contains 1 to 5 carbon atoms;
   (b) uniformly admixing about 0.05 to about 0.5 weight percent of said elastomeric copolymer with the fluorocarbon polymer;
   (c) heating the mixture of fluorocarbon polymer and elastomeric copolymer to a temperature sufficient to melt the mixture; and
   (d) extruding the resulting mixture.

10. The process of claim 9 wherein the thermoplastic fluorocarbon polymer is a copolymer of tetrafluoroethylene with about 9 to about 14 weight percent hexafluoropropylene, said copolymer having a melt viscosity of about $1 \times 10^3$ to about $1 \times 10^6$ Pa.s.

11. The process of claim 9 wherein the elastomeric copolymer comprises about 57 to about 75 mol percent tetrafluoroethylene and about 25 to about 40 mole percent of the perfluoro(alkyl vinyl ether) and the alkyl group of the perfluoro(alkyl. vinyl ether) is perfluoromethyl.

12. The process 11 wherein the elastomeric copolymer further contains up to about 3 mol percent of a third fluorine-containing comonomer copolymerizable therewith.

13. The process of claim 9 wherein the mixture is heated to at least about 300° C.

* * * * *